United States Patent
Charbit et al.

(10) Patent No.: US 9,559,824 B2
(45) Date of Patent: Jan. 31, 2017

(54) METHOD AND APPARATUS FOR EXTENDING CONTROL SIGNALLING IN AN LTE NETWORK

(71) Applicant: Broadcom Corporation, Irvine, CA (US)

(72) Inventors: Gilles Charbit, Farnborough (GB); Jianke Fan, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 336 days.

(21) Appl. No.: 14/148,035

(22) Filed: Jan. 6, 2014

(65) Prior Publication Data

US 2014/0192733 A1    Jul. 10, 2014

(30) Foreign Application Priority Data

Jan. 7, 2013 (GB) .................................. 1300186.2
Jan. 18, 2013 (GB) .................................. 1300940.2

(51) Int. Cl.
*H04L 5/00*    (2006.01)

(52) U.S. Cl.
CPC ........... *H04L 5/0053* (2013.01); *H04L 5/0007* (2013.01)

(58) Field of Classification Search
CPC .... H04L 1/0027; H04L 1/1861; H04L 1/1887; H04L 5/0053; H04L 5/0094; H04L 5/0007
See application file for complete search history.

(56) References Cited

U.S. PATENT DOCUMENTS

| | | | |
|---|---|---|---|
| 2013/0003663 A1 | 1/2013 | Blankenship et al. | |
| 2013/0016692 A1* | 1/2013 | Chen ..................... | H04L 5/0094 370/330 |
| 2013/0039188 A1* | 2/2013 | Larsson ................ | H04L 5/0053 370/241 |
| 2013/0083753 A1* | 4/2013 | Lee ..................... | H04L 72/0453 370/329 |
| 2013/0094457 A1* | 4/2013 | Seo ...................... | H04W 72/042 370/329 |
| 2013/0195069 A1* | 8/2013 | Frederiksen ........... | H04W 48/12 370/330 |
| 2013/0258938 A1* | 10/2013 | Sagfors ................. | H04W 72/02 370/312 |
| 2013/0308572 A1* | 11/2013 | Sayana ................ | H04W 72/048 370/329 |

FOREIGN PATENT DOCUMENTS

WO    2010049754    5/2010

\* cited by examiner

*Primary Examiner* — Curtis A Alia
(74) *Attorney, Agent, or Firm* — Oblon, McClelland, Maier & Neustadt, L.L.P.

(57) ABSTRACT

A method for a wireless network node to support an extended control signaling is provided. The method comprises configuring a control signaling message over extended control symbols on a layer 1 (L1) downlink control channel, the control signaling message encoded over an increased aggregation of control channel elements (CCEs) in a time domain; placing the controlling signaling message in a designated set of subframes on the L1 downlink control channel; indicating a support for the extended control signaling to one or more UEs; indicating to the one or more UEs a position of the designated set of the subframes in a spare field of the Master Information Block (MIB); and transmitting the control signaling message to the one or more UEs over the L1 downlink control channel.

18 Claims, 7 Drawing Sheets

METHOD AND APPARATUS FOR EXTENDING CONTROL SIGNALLING IN AN LTE NETWORK

TECHNICAL FIELD

An example embodiment of the present invention relates generally to wireless communications, and, more particularly, to extending control signaling to support low-cost, Machine Type Communication (MTC)-capable devices in an LTE network.

BACKGROUND

A support for a MTC-capable UE in a LTE network is gaining attention because integrating the MTC capabilities into a LTE network has an advantage of supporting two widely deployed network devices in a single network. A low-cost solution may involve using only single receiving RF chain because it may significantly lower the costs of LTE MTC devices. It is known that there will likely be about 3 dB coverage loss with single receiver RF chain compared to regular LTE UEs. So a solution to compensate for control signaling coverage loss due to use of a single receiving RF chain is needed.

Some of the proposed solutions to the issue of control signaling coverage loss may require either an increased densification of sites or remedial solutions at the receiver such as small home area networks, meshes, or external antennas with additional antenna feeds. These solutions may be impractical, require additional spectrum, and lead to higher cost. Therefore a coverage improvement solution is desirable that can meet the lost-cost requirement of MTC-capable devices such as smart-metering devices, while utilizing LTE sites and RF hardware, and efficiently sharing the same spectrum/carrier as LTE to reduce costs for network deployment.

A signaling coverage improvement may involve downlink control channel coverage improvement because downlink control signaling is the bottleneck of the LTE in downlink coverage. A downlink control signaling is located at the start of each downlink subframe up to the first three OFDM symbols. Downlink control signaling may be carried by a Physical Downlink Control Channel (PDCCH) which may carry DL scheduling assignment and uplink scheduling grants. Thus, there is a need to extend the PDCCH signaling channel to support MTC-capable UEs.

The following abbreviations are used in this application.
A/N Acknowledge/Non-Acknowledge
BS Base Station
CCE control channel element
CSS Common Search Space
DL Downlink
ePDCCH enhanced Physical Downlink Control Channel
eNB Enhanced Node B. Name for Node B in LTE
FDM Frequency Domain Multiplexing
HARQ Hybrid Adaptive Repeat and Request
LTE Long Term Evolution
LTE-A Long Term Evolution Advanced
M-ePDCCH MTC-capable extended PDCCH
M-PDCCH MTC-capable PDCCH
MIB Master Information Block
MTC Machine Type Communication
NCT New Carrier Type
OS OFDM Symbol
PDCCH Physical Downlink Control Channel
PDSCH Physical Downlink Shared Channel
RF Radio Frequency
RRC Radio Resource Control
SIB1 System Information Blocks
USS User Search Space
TA Timing Advance
UE User Equipment
UL Uplink
UMTS Universal Mobile Telecommunications System
UTRAN UMTS Radio Access Network
WCDMA Wideband Code Division Multiple Access

SUMMARY

Various aspects of the invention are set out in the claims.

In accordance with an example embodiment of the present invention, a method for a wireless network node to support an extended control signaling comprises configuring a control signaling message over extended control symbols on a layer (L1) downlink control channel, the control signaling message encoded over an increased aggregation of control channel elements (CCEs) in a time domain; placing the controlling signaling message in a designated set of subframes on the L1 downlink control channel; indicating a support for the extended control signaling to one or more UEs; indicating to the one or more UEs a position of the designated set of the subframes in a system information block 1 (SIB1) information element; and transmitting the control signaling message to the one or more UEs over the L1 downlink control channel.

In accordance with an example embodiment of the present invention, an apparatus for use in a wireless network node to support an extended control signaling, comprises a processing system, which may be embodied as a processor and at least one memory configured to store computer program instructions. The processing system is configured to configure a control signaling message over extended control symbols on a layer 1 (L1) downlink control channel, the control signaling message encoded over an increased aggregation of control channel elements (CCEs) in a time domain; place the controlling signaling message in a designated set of subframes on the L1 downlink control channel; indicate a support for the extended control signaling to one or more UEs; indicate to the one or more UEs a position of the designated set of the subframes in a spare field of the Master Information Block (MIB); and transmit the control signaling message to the one or more UEs over the L1 downlink control channel.

In accordance with another example embodiment of the present invention, a method for a Machine Type Communication (MTC)-capable UE to support an extended control signaling comprises determining a position of a predetermined subset of subframes based on a detected MIB; and obtaining an extended control signaling message from the subset of subframes, the extended control signaling message encoded over extended control symbols on the L1 downlink control channel and over an increased aggregation of control channel elements (CCEs) in a time domain.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received and/or stored in accordance with embodiments of the present invention. Likewise, as used herein, the terms "active cell," "active base station," and "active nodeB" may be used interchangeably to refer to a base station of a cellular network to which an UE is currently connected to via a wireless connection. Thus, use of any such terms should not be taken to limit the spirit and scope of embodiments of the present invention.

Additionally, as used herein, the terms 'circuitry' and 'module' refer to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
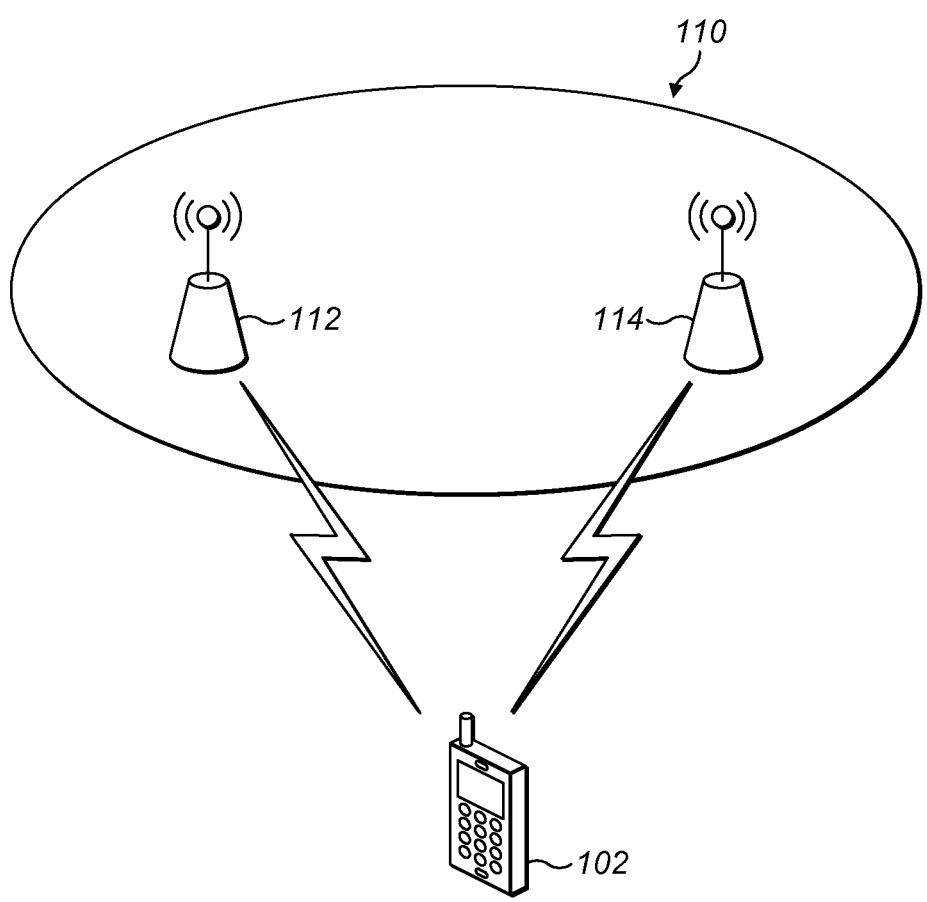
FIG. 1 illustrates an example wireless system in accordance with an example embodiment of the invention.

Referring now to FIG. 1, an example wireless network 100 is provided in accordance with an example embodiment of the invention. The wireless system 100 includes a UE 102, and an active cell set 110 which in turn includes a first cell 112, and a second cell 114. The UE 102 is currently connected to the cell 112 via a wireless connection and may also receive signals from the other cell 114 of the active cell set 110. The cell 112, also termed active cell, as well as the other cell 114 may be an LTE base station eNodeB.

In one example embodiment, the UE 102 roams into an area covered by the active cell set 110 and attempts to reselect the cell 112. The cell 112 may first attempt to exchange capability information with the UE 102, the capability information including whether MTC-support is available. The cell 112 may indicate its support for an extended control signaling to support MTC-enabled UEs in a broadcast MIB message. The UE 102 may indicate its support for the extended control signaling via a signaling message. Upon determining that the UE 102 is capable of the extended control signaling, the cell 112 may configure a control signaling message over extended control symbols on a layer 1 (L1) downlink control channel, with the control signaling message being encoded over an increased aggregation of control channel elements (CCEs) in both time domain and frequency domain. The control signaling message may include radio resource allocation and other control information. The cell 112 may then put the configured extended control signaling message in designated subframes of a downlink control channel and indicate to the UE 102 a subframe position of the extended control signaling message in an MIB message, before transmitting the signaling message itself. In one example embodiment, the UE 102 detects the MIB message sent from the cell 112 and obtains the control signaling message according to the subframe position indicated in the received MIB message. The UE 102 may then decode the extended control signaling messages in both time and frequency domains according to the way the control signaling message was encoded and use the decoded control signaling message to perform resource allocation or other tasks, as appropriate for the contents of the extended control signaling message.

Figure 2:
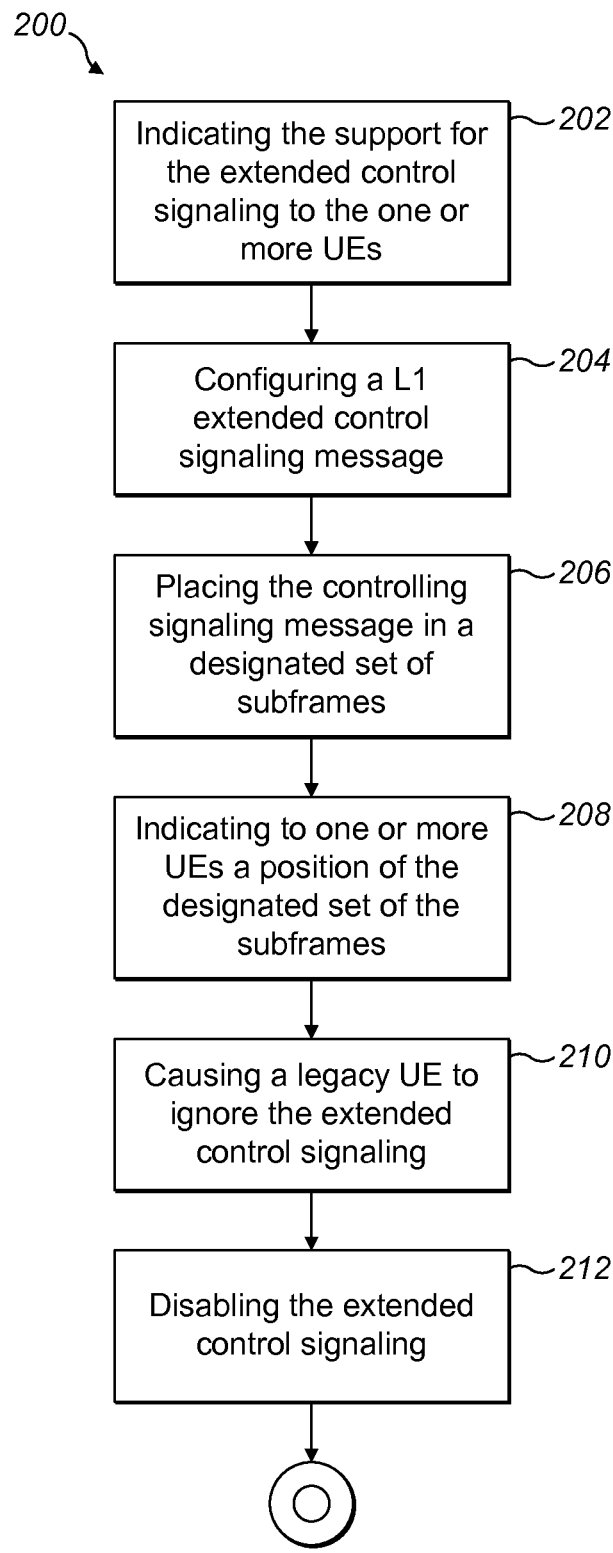
FIG. 2 illustrates an example method for extending L1control signaling by a wireless network node in accordance with an example embodiment of the invention.

FIG. 2 illustrates an example method 200 for extending L1control signaling at an active cell such as an eNodeB in accordance with an example embodiment of the invention. The method 200 may include indicating the support for the extended control signaling to one or more UEs at step 202, configuring an extended control signaling message at step 204, and placing the controlling signaling message in a designated set of subframes at step 206. The method 200 may also include indicating to one or more UEs a position of the designated set of the subframes at step 208, causing a legacy UE to ignore the extended control signaling at step 210 and disabling the extended control signaling at step 212.

In one example embodiment, indicating the support for the extended control signaling to the one or more UEs at step 202 may include using a spare field in a master information block (MIB) to indicate the support for the extended control signaling. The MIB may be broadcast by an active cell in a broadcasting channel (BCH) to all associated UEs within the reach of the cell. In one example embodiment, indicating the support for the extended control signaling at step 202 may also include indicating more specifically which version of 3GPP Release is supported for the extended control signaling and within a release, what type of extended signaling is support. For example, the active cell may indicate either an MTC-capable PDCCH (M-PDCCH), MTC-capable extended PDCCH (M-ePDCCH) or both is supported for a Rel-12 MTC-capable UE. A set of flexible rules may be used to provide options for the eNodeB to indicate different types of support for extended control signaling. In one example embodiment, if only a new carrier type needs to be supported without considering other carrier type such as a 3GPP Release-8 PDCCH, one bit on MIB may be sufficient to indicate the support for extended control signaling. In one example embodiment, the active cell 112 may use two spare bits on MIB to indicate the support for the extended control signaling as follows
"00" no extended coverage;
"01" M-PDCCH only;
"10" M-ePDCCH only;
"11" M-PDCCH and M-ePDCCH In one example embodiment, configuring an L1extended control signaling message at step 204 may include configuring a control signaling message over extended control symbols on a layer 1(L1) downlink control channel, the control signaling message encoded over an increased aggregation of control channel elements (CCEs) in a time domain. In one example embodiment, configuring the extended control signaling message at step 204 may also include configuring the control signaling message over all OFDM symbols in a first slot of subframes for an extended 3GPP Release-8 physical data control channel, or MTC-capable physical data control channel (M-PDCCH), or in multiple of two slots for 3GPP Release-11 extended physical data control channel (ePDCCH). The extended control signaling message may be further encoded over the increased aggregation of the CCEs in a frequency domain in addition to the time domain. In one example embodiment, the increased aggregation of CCEs may include either an aggregation of the CCEs across physical resource blocks (PRB) pairs in the frequency domain in one subframe, or an aggregation of the CCE in the time domain in consecutive subframes suitable for MTC-capable UEs that are transmitted with a low data rate, and a large latency tolerance, or both. The extended control signaling message encoded over the increased aggregation of the CCEs in the time domain may be encoded over available symbols in a subframe for M-PDCCH or across multiples of two slots for M-ePDCCH control channel.

In one example embodiment, 8 PRBs (1.44 MHz) or more on user search space (USS) and 16 PRBs (2.88 MHz) or more on common search space (CSS) for a 5 MHz narrow bandwidth with 25 PRBs may be obtained by aggregating the CCEs across the PRB pairs in frequency domain in one subframe. In another example embodiment, to achieve aggregation levels greater than L=8 in USS and greater than L=16 in CSS for a 5-MHz narrow-band MTC-capable UE, aggregation in time domain may be used. For example, assuming a L=16 for CSS for a 5 MHz MTC-capable UE re-using Rel-11 specifications for ePDCCH in a frequency domain and assuming a M-ePDCCH with multiples of two slots equal to 2, a time domain aggregation of CCEs over 2 subframe, an aggregation of CEs in frequency domain and then in time domain may produce L=16*2=32 for CSS or roughly 3 dB gain for M-ePDCCH detection. Similarly, for a M-ePDCCH with multiple of two slots equal to 4, the achievable aggregation level is L=16*4=64 or roughly 6 dB gain for M-ePDCCH detection. Thus, the extended control signaling may sufficiently compensate for a roughly 3 dB loss due to low-cost narrow-band MTC-capable UEs with only one receiving antenna instead of two for a regular LTE UE. In addition, a gain larger than 3 dB may readily be obtained by increasing the aggregation level in time domain.

In one example embodiment, placing the extended controlling signaling message in a designated set of subframes at step 206 may include using a L-bit bitmap SubframeMTC-config to indicate the designated subframe subsets in a radio frame subset RadioFrame-MTC for the extended control signaling message to allow an MTC-capable UE to detect the extended signaling message. As an example, L=5 bits with value 00001 indicates subframe subsets #0, #1 (ePDCCH repeated over two subframes); 00011 indicates subframe subsets #0, #1, #2,#3 (ePDCCH repeated over four subframes); 00111 indicates subframe subsets #0, #1, #2,#3, #4, #5, #6, #7 (ePDCCH repeated over eight subframes); 01111 indicates subframe subsets #0, #1, #2,#3, #4, #5, #6, #7 in two consecutive radio frames (ePDCCH repeated over 16 subframes); 11111 indicates subframe subsets #0, #1, #2,#3, #4, #5, #6, #7 in four consecutive radio frames (ePDCCH repeated over 32 subframes).

In one example embodiment, placing the extended controlling signaling message in a designated set of subframes at step 206 may include using a radio frame subset RadioFrame-MTC with a periodicity based on a System Frame Number (SFN), where the RadioFrame-MTC=SFN mod RadioframePeriodicity-MTC, with the RadioframePeriodicity-MTC being an M-bit field with value in $[2^M, \ldots, 2, 1, 00]$. For example, M=5 with 00001 may indicate that the repeated M-ePDCCH may be scheduled starting at RadioFrameStart-MTC=0 with 1 radio frames periodicity; 00010 indicates that the repeated M-ePDCCH may be scheduled starting at RadioFrameStart-MTC=0 with 2 radio frames periodicity; 00011 indicates the repeated M-ePDCCH may be scheduled starting at RadioFrameStart-MTC=0 with 3 radio frames periodicity; . . . ; 11111 indicates the repeated M-ePDCCH may be scheduled starting at RadioFrameStart-MTC=0 with 31 radio frames periodicity. The L-bit bitmap SubframeMTC-config and M-bit field radioframePeriodicity-MTC are indicated in a spare field of the master information block (MIB). In the above example, with M=5 and L=5, these new parameters may fit the spare field of MIB which is 10 bits in 3GPP Rel-8 specifications. Larger values of M and L may be possible if MTC-specific MIB are specified. Other SIB may also be used to indicate these parameters if they are not transmitted on the DL SCH, which may need ePDCH and associated PDSCH. The UE may need to know the subset of predetermined subframes before it can detect the repeated ePDCCH.

In one example embodiment, indicating to one or more UEs a position of the designated set of the subframes at step 208 may include indicating the position of the designated subset of the subframes in a spare field of the MIB information element and transmitting the MIB on the P-BCH to the one or more UEs prior to transmitting the control signaling message on the downlink control channel.

In one example embodiment, causing a legacy UE to ignore the extended control signaling at step 210 may include causing a legacy UE to be oblivious to the indication of the extended control signaling in the MIB and to the indication of the designated set of subframes carrying the extended control signaling message included in a spare field of the MIB. The extended control signaling may be carried out in such a way that a legacy UE may carry on its normal operations without being adversely affected.

In one example embodiment, disabling the extended control signaling at step 212 may include determining at the active cell 212 to disable the extended control signaling to avoid extra processing, for circumstances where the extended control signaling is either not merited or not needed. One circumstance is that all or majority of the associated UEs are legacy UEs and the benefits of extended control signaling may not justify the cost of extra processing associated with the extended control signaling. Another circumstance is that all associated UEs, either MTC-capable or legacy ones, are located at or near the center of the active cell with sufficient signal strengths and the need for the extended control signaling is minimal. In yet another circumstance, a cell-edge MTC-capable UE is being offloaded or handover to another cell and the extended control signaling is thus not needed. In one example embodiment, disabling the extended control signaling at step 212 may also include signaling an associated MTC-capable UE to disable the extended control signaling at the UE to avoid extra processing under one of the above circumstances. An active cell may decide whether or not to enable or disable the extended control signaling for an associated UE based on the UE's timing advance or path loss, or a distance from the edge of a cell.

The method 200 has an effect of extending control signaling to support MTC-capable UEs, which normally have limited reception range. In one example embodiment, the method 200 may be implemented at the active cell 112 of FIG. 1. The method 200 is for illustration only and the steps of the method 200 may be combined, divided, or executed in a different order than illustrated, without departing from the scope of the invention of this example embodiment.

Figure 3:
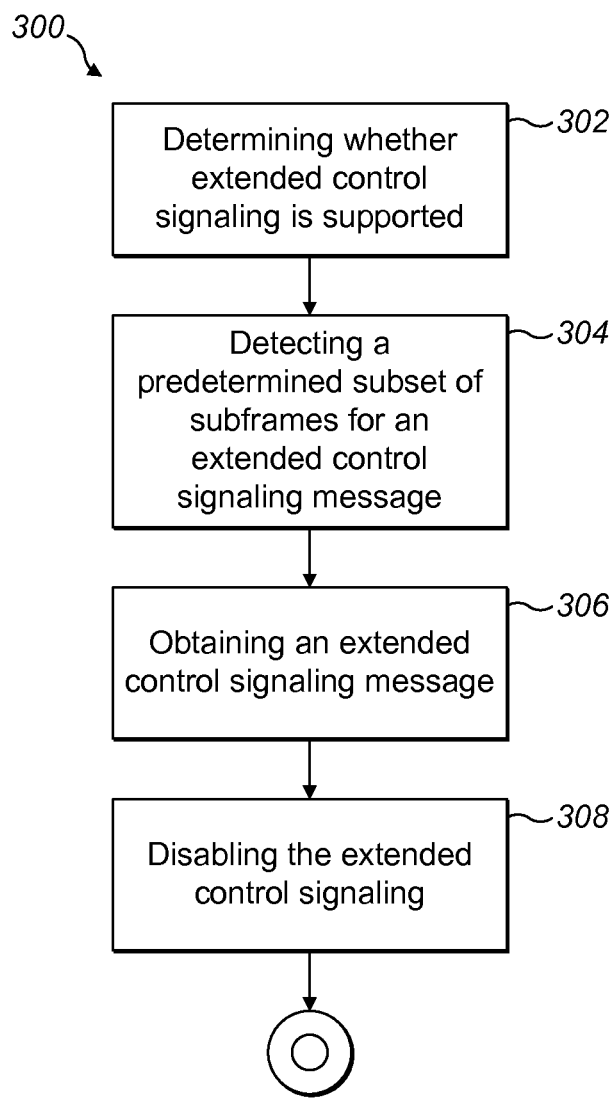
FIG. 3 illustrates an example method for support of an extended L1control signaling by a user equipment (UE) in accordance with an example embodiment of the invention.

FIG. 3 illustrates an example method 300 for extending L1control signaling at a user equipment (UE) in accordance with an example embodiment of the invention. The method 300 may include determining whether the extended control signaling is supported at step 302, determining a position of a predetermined subset of subframes for extended control signaling message at step 304, obtaining an extended control signaling message at step 306 and disabling the extended control signaling at step 308.

In one example embodiment, determining whether the extended control signaling is supported at step 302 may include detecting a master information block (MIB) on each cell in an active cell set via receiving a broadcast message from the active cell and examining contents of the received broadcast message. An MIB spare field may indicate more specifically which 3GPP release is supported for the extended control signaling and within a release, what type of extended signaling is support. For example, the active cell or eNodeB may indicate either M-PDCCH, M-ePDCCH or both is supported for a 3GPP Rel-12 MTC-capable UE. A set of flexible rules may be defined to provide flexible options for the eNodeB to indicate different types of extended signaling support.

In one example embodiment, detecting a predetermined subset of subframes for an extended control signaling message at step 304 may include detecting the controlling signaling message in a designated set of subframes. In one example embodiment, detecting a predetermined subset of subframes at step 304 may include using a L-bit bitmap SubframeMTC-config to indicate the designated subframe subsets in the radio frame for the extended control signaling message. In one example embodiment, the position of the controlling signaling message in a designated set of subframes may be determined using a L-bit bitmap SubframeMTC-config and M-bit field radioframePeriodicity-MTC that are indicated in the spare field of the MIB.

In one example embodiment, obtaining an extended control signaling message at step 306 may include obtaining the control signaling message over extended control symbols on a L1downlink control channel, the control signaling message that is encoded over an increased aggregation of control channel elements (CCEs) in a time domain. In one example embodiment, obtaining the extended control signaling message at step 306 may also include obtaining the control signaling message over all OFDM symbols in a first slot of subframes for an extended 3GPP Release-8 physical data control channel (ePDCCH) or in multiple of two slots for extended 3GPP Release-11 ePDCC. The control signaling message may be further encoded over the increased aggregation of the CCEs in a frequency domain in addition to the time domain. In one example embodiment, the increased aggregation of control channel elements may include either aggregation of the CCEs across PRB pairs in the frequency domain in one subframe, aggregation of the CCE in the time domain in consecutive subframes suitable for MTC-capable UEs that are transmitted with a low data rate, and a large latency tolerance, or both. The control signaling message encoded over the increased aggregation of the CCE in the time domain may be encoded over available symbols in a subframe for M-PDCCH or across multiple of two slots for M-ePDCCH control channel.

In one example embodiment, disabling the extended control signaling by the UE at step 308 may include receiving a signaling message from the associated active cell on a broadcast channel or a dedicated signaling channel to disable the extended control signaling to avoid extra processing. The UE may disable the extended control signaling as instructed by the associated active cell for certain circumstances where the extended control signaling is either not merited or not needed. Some example circumstances may include the case where all or majority of the associated UEs are legacy UEs, and the case where all associated UEs are located at the center of the cell. In one example embodiment, the UE may determine on its own that the extended control signaling is not needed and disable the extended control signaling as opposed to being instructed by the active cell. One such example circumstance is when the UE initiates a reselection procedure to be handed over to a new cell and extended control signaling is no longer needed.

The method 300 has an effect of extending control signaling for a low-cost MTC-capable UE which may normally have limited reception range. In one example embodiment, the method 300 may be implemented at the UE 102 of FIG. 1 or at the apparatus 400 of FIG. 4. The method 300 is for illustration only and the steps of the method 300 may be combined, divided, or executed in a different order than illustrated, without departing from the scope of the invention of this example embodiment.

Figure 4:
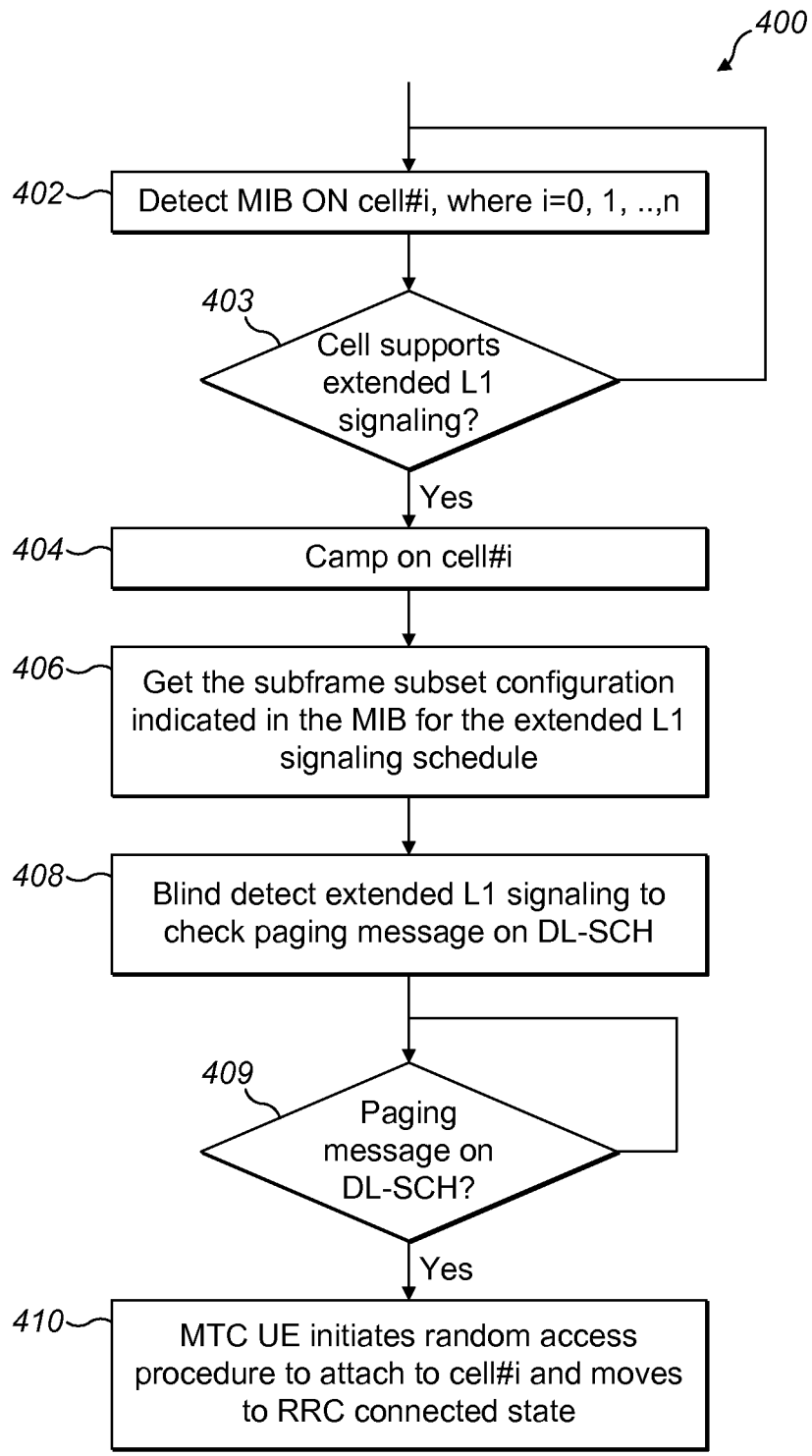
FIG. 4 illustrate a flowchart for an MTC-capable UE re-selecting a cell in accordance with an example embodiment of the invention.

FIG. 4 illustrates a flowchart for an MTC-capable UE to re-select a cell in accordance with an example embodiment of the invention. The MTC-capable UE in a RRC idle state may first detect an MIB on each cell in an active cell set at step 402 and then determine whether the active cell supports an extended L1control signaling at step 403. The details on how the UE may determine whether the active cell supports the extended control signaling are described at step 302 of FIG. 3. Once the UE determines that the cell #i support the extended control signaling, the UE may camp on the cell at step 404 and read the a configuration of the extended control signaling from a spare field of the MIB at step 406. With the configuration information of the extended control signaling, the UE may start to detect the extended control signaling on the DL-SCH by checking a paging message on the DL-SCH at step 408. If the paging message is sent by the cell #i within the tracking area at step 409, the MTC-capable UE may detect an extended control signalling message on an M-PDCCH or an M-ePDCCH, and may initiate a random access procedure to move to the RRC connected state and receive a call at step 410.

Figure 5:
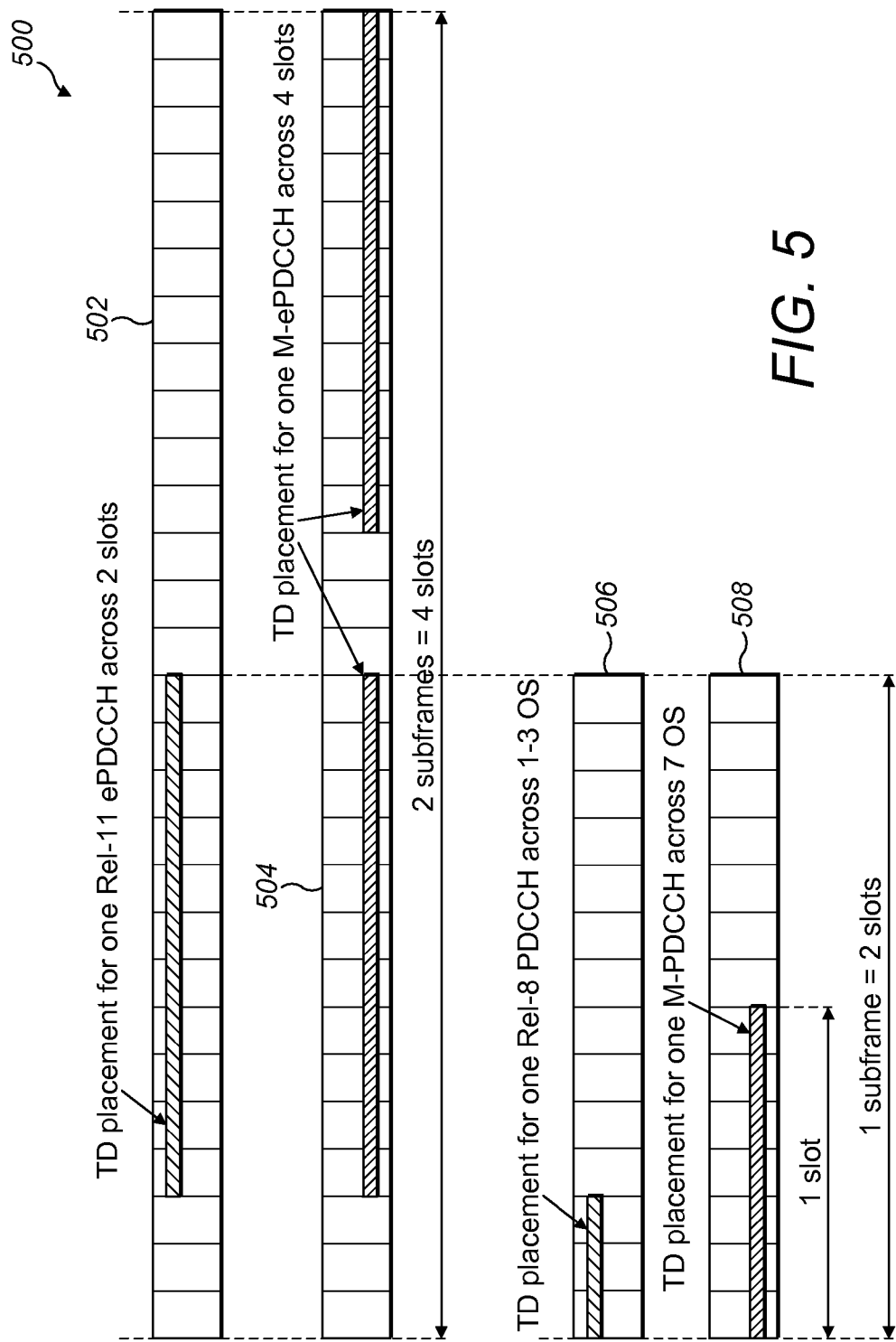
FIG. 5 illustrates an example mapping of an M-PDCCH and an M-ePDCCH to OFDM symbols (OS) and subframes in accordance with an example embodiment of the invention.

FIG. 5 illustrates an example mapping 500 of an M-PDCCH and an M-ePDCCH to OFDM symbols (OS) and subframes in accordance with an example embodiment of the invention. A time domain (TD) figuration for Rel-11 ePDCCH across 2 slots is shown in block 502 and a time domain configuration for one M-ePDCCH across 2 subframes or 4 slots is shown at block 504. A 3GPP Rel-8 PDCCH may be mapped to 3 OSs in the first slot of a subframe at block 506 and an M-PDCCH may be mapped to 7 OSs in first slot of a subframe at block 508. A Rel-11 ePDCCH may be mapped to 11 OSs in a subframe and an M-ePDCCH may be mapped to 22 OS in 2 subframes.

Figure 6:
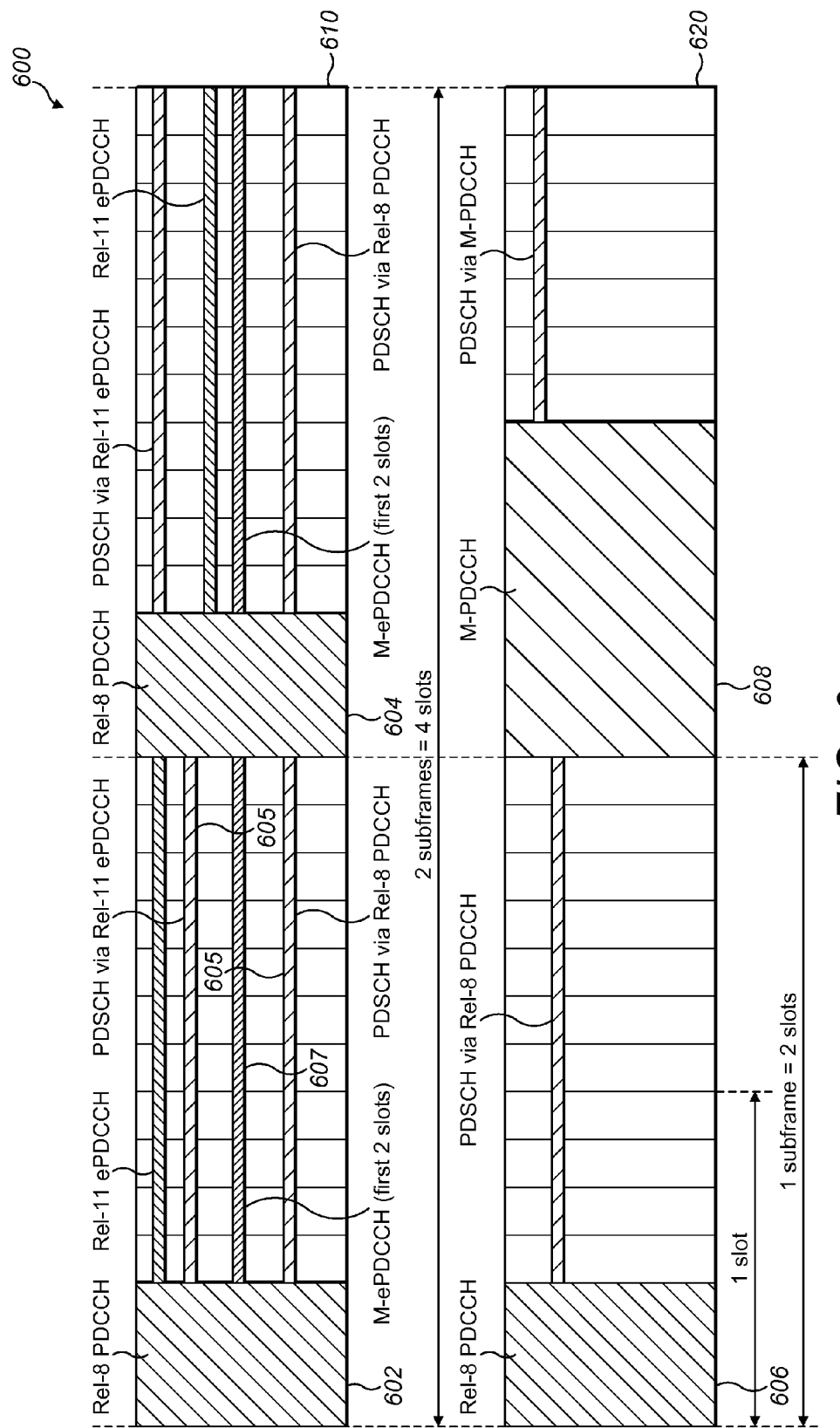
FIG. 6 illustrates an example scheduling of PDSCH in accordance with an example embodiment of the invention.

FIG. 6 illustrates example mappings 600 of ePDCCH to PRBs in accordance with an example embodiment of the invention. The top half 610 of the mappings 600 illustrates an example of scheduling a PDSCH with an M-ePDCCH. The horizontal lines and vertical lines of FIG. 6 may represent time and frequency respectively and each unit may represent one symbol with 7 symbols making up one slot. The resource blocks 602, 604 and 606 may represent Rel-11 ePDCCH that are mapped to a subset of a PRB pair, with a PRB pair occupying 2 slots or one subframe. The resources 605 may represent the PRB resource scheduled for PDSCH which may include PDSCH of a UE scheduled via ePDCCH or PDSCH of a UE scheduled via PDCCH. The resource 607 in time domain may represent a proposed M-ePDCCH. In one example embodiment, the bottom half 620 of the example mapping 600 illustrates an example scheduling of a Rel-8 PDCCH with M-PDCCH. The resource block 608 may represent an M-PDCCH as described above. In this example, the PDSCH may be scheduled in the same subframe carrying the Rel-11 ePDCCH on different PRB pairs according to the Release 11 specifications. In case of M-ePDCCH over a multiple of 2 slots (i.e. multiple subframes), it may be sufficient that PDSCH be scheduled on different PRBs in the same multiple of 2 slots where the M-ePDCCH is scheduled. The M-ePDCCH may indicate the resource allocation for the PDSCH in any of the available PRBs in the last of the multiple subframes carrying the M-ePDCCH as in the 3GPP Rel-11 specifications.

Figure 7:
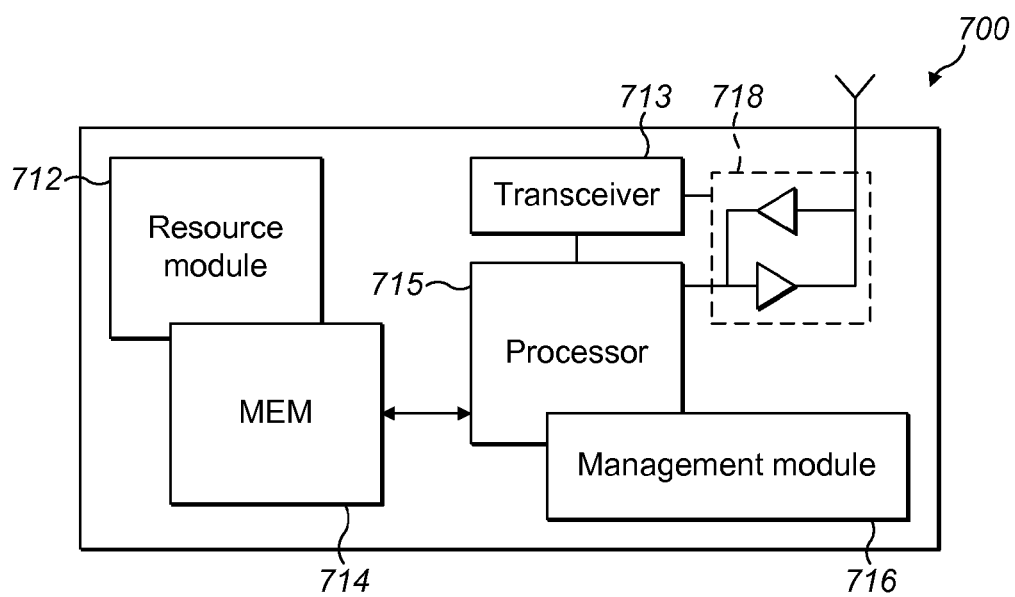
FIG. 7 illustrates a wireless apparatus in accordance with an example embodiment of the invention.

FIG. 7 illustrates an example wireless apparatus in accordance with an example embodiment of the invention. In FIG. 7, the wireless apparatus 700 may include a processor 715, a memory 714 coupled to the processor 715, and a suitable transceiver 713 (having a transmitter (TX) and a receiver (RX)) coupled to the processor 715, coupled to an antenna unit 718 and a power management module 716. The memory 714 may store programs such as a resource module 712. The wireless apparatus 700 may be at least part of a generic 4th generation handset, or an LTE compatible mobile station.

The processor 715 or some other form of generic central processing unit (CPU) or special-purpose processor such as digital signal processor (DSP), may operate to control the various components of the wireless apparatus 700 in accordance with embedded software or firmware stored in memory 714 or stored in memory contained within the processor 715 itself. In addition to the embedded software or firmware, the processor 715 may execute other applications or application modules stored in the memory 714 or made available via wireless network communications. The application software may comprise a compiled set of machine-readable instructions that configures the processor 715 to provide the desired functionality, or the application software may be high-level software instructions to be processed by an interpreter or compiler to indirectly configure the processor 715.

In an example embodiment, the resource module 712 may be configured to determine a support for an extended control signaling on each of cells in an active cell set and a configuration of the extended control signaling in a spare field of the MIB. The resource module 712 may also be configured to obtain an extended control signaling message from the subset of subframes, the extended control signaling message encoded over extended control symbols on a layer 1(L1) downlink control channel and over an increased aggregation of control channel elements in a time domain. The resource module 712, in collaborations with other module, is capable of communicating with an active cell or base station via standards protocol such as RRC protocol.

In one example embodiment, the transceiver 713 is for bidirectional wireless communications with another wireless device. The transceiver 713 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 713, portions of the antenna unit 718, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 718 may be provided to convert between wireless signals and electrical signals, enabling the wireless apparatus 700 to send and receive information from a cellular network or some other available wireless communications network or from a peer wireless device. In an embodiment, the antenna unit 718 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 718 may include antenna tuning and/or impedance matching components, RF power amplifiers, and/or low noise amplifiers.

In general, the various exemplary embodiments of the wireless apparatus 700 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 700 may be implemented in the UE 102 of FIG. 1.

Without in any way limiting the scope, interpretation, or application of the claims appearing below, a technical effect of one or more of the example embodiments disclosed herein is a coverage improvement for L1signaling of LTE MTC-capable UEs by using existing network deployment. Another technical effect of one or more of the example embodiments disclosed herein is to support MTC-capable UEs with LTE sites and RF hardware and with efficiently shared spectrums/carriers.

Embodiments of the present invention may be implemented in software, hardware, application logic or a combination of software, hardware and application logic. The software, application logic and/or hardware may reside on a mobile station, an access point, a user equipment or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a mobile device, with one example of a mobile device described and depicted in FIG. 7. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for a wireless network node to support an extended control signaling, the method comprising:
   configuring a control signaling message over extended control symbols on a layer 1 (L1) downlink control channel, the control signaling message encoded over an aggregation of control channel elements (CCEs) in a time domain;
   placing the control signaling message in a designated set of subframes on the L1 downlink control channel;
   indicating a support for the extended control signaling to one or more UEs;
   indicating to the one or more UEs a position of the designated set of the subframes in a spare field of a Master Information Block (MIB); and
   transmitting the control signaling message to the one or more UEs over the L1 downlink control channel.

2. The method of claim 1, wherein configuring the control signaling message over the extended control symbols comprises configuring the control signaling message over OFDM symbols in a first slot of subframe for an extended 3G PP Release-8 MTC-capable physical data control channel (M-PDCCH) or in multiples of two slots for a 3GPP Release-11 MTC-capable extended PDCCH (M-ePDCCH).

3. The method of claim 2, wherein the control signaling message encoded over the aggregation of the CCE in the time domain comprises the signaling message encoded over available symbols in a subframe for M-PDCCH or across the multiples of two slots for M-ePDCCH control channel.

4. The method of claim 1, wherein the control signaling message is further encoded over the aggregation of the CCEs in a frequency domain.

5. The method of claim 4, wherein the aggregation of the CCEs comprise at least one of
   aggregation of the CCEs across physical resource block (PRB) pairs in the frequency domain in one subframe; or
   aggregation of the CCEs in the time domain in consecutive subframes transmitted with a low data rate, and a large latency tolerance.

6. The method of claim 1, further comprising:
   at least one of causing a legacy UE to ignore the extended control signaling;
   disabling the extended control signaling upon discovering that most or all of the one or more UEs are legacy UEs or most or all of the one or more UEs are located at a cell center with sufficient signal strengths; or
   signaling the one or more UEs to disable the extended control signaling to avoid extra processing.

7. The method of claim 1, wherein indicating to the one or more UEs the position of the designated subset of the subframes comprises
   indicating the position of the designated subset of the subframes in a spare field of the MIB; and
   transmitting the MIB to the one or more UEs prior to transmitting the control signaling message on the downlink control channel.

8. The method of claim 7, wherein the designated subset of the subframes comprise a subframe subset indicated by a L-bit bitmap subframeMTC-config in a radio frame subset radioFrame-MTC with a periodicity indicated by an M-bit field radioframePeriodicny-MTC with value in $[2^m, \ldots, 2, 1, 0]$ and the subframeMTC-config and radioframePeriodicity-MTC are indicated in the spare field of the MIB.

9. The method of claim 1, further comprising:
   indicating the support for the extended control signaling to the one or more UEs via a system information element in a master information block (MIB).

10. An apparatus for use in a wireless network node to support an extended control signaling, the apparatus comprising
    a processing system comprising a processor and at least one memory configured to store computer program instructions, in which the processing system is arranged to:
    configure a control signaling message over extended control symbols on a layer 1 (L1) downlink control channel, the control signaling message encoded over an aggregation of control channel elements (CCEs) in a time domain;
    place the control signaling message in a designated set of subframes on the L1 downlink control channel;
    indicate a support for the extended control signaling to one or more UEs;
    indicate to the one or more UEs a position of the designated set of the subframes in a spare field of the Master Information Block (MIB); and
    transmit the control signaling message to the one or more UEs over the L1 downlink control channel.

11. The apparatus of claim 10, wherein the processing system is further arranged to configure the control signaling message over OFDM symbols in a first slot of subframe for an extended 3GPP Release-8 MTC-capable physical data control channel (M-PDCCH) or in multiples of two slots for a 3GPP Release-11 MTC-capable extended PDCCH (M-ePDCCH).

12. The apparatus of claim 10, wherein the processing system is further arranged to:
    indicate the position of the designated subset of the subframes in a spare field of the SIB 1 information element; and transmit the SIB 1 information element in a system information message to the one or more UEs prior to transmitting the control signaling message on the downlink control channel.

13. A network node configured to support extended control signaling, the network node comprising:
   circuitry configured to:
      configure a control signaling message over extended control symbols on a layer 1(L1) downlink control channel, the control signaling message encoded over an aggregation of control channel elements (CCEs) in a time domain;
      place the control signaling message in a designated set of subframes on the L1 downlink control channel;
      indicate a support for the extended control signaling to one or more UEs; and
      indicate to the one or more UEs a position of the designated set of the subframes in a spare field of a Master Information Block (MIB);
   a communication interface configured to transmit the control signaling message to the one or more UEs over the L1 downlink control channel.

14. The network node of claim 13, wherein configuring the control signaling message over the extended control symbols comprises configuring the control signaling message over OFDM symbols in a first slot of subframe for an extended 3GPP Release-8MTC-capable physical data control channel (M-PDCCH) or in multiples of two slots for a 3GPP Release-11 MTC-capable extended PDCCH (M-ePDCCH).

15. The network node of claim 14, wherein the control signaling message encoded over the aggregation of the CCE in the time domain comprises the signaling message encoded over available symbols in a subframe for M-PDCCH or across the multiples of two slots for M-ePDCCH control channel.

16. The network node of claim 13, wherein the control signaling message is further encoded over the aggregation of the CCEs in a frequency domain.

17. The network node of claim 16, wherein the aggregation of the CCEs comprise at least one of
   aggregation of the CCEs across physical resource block (PRB) pairs in the frequency domain in one subframe; or
   aggregation of the CCEs in the time domain in consecutive subframes transmitted with a low data rate, and a large latency tolerance.

18. The network node of claim 13, further comprising:
   at least one of causing a legacy UE to ignore the extended control signaling;
   disabling the extended control signaling upon discovering that most or all of the one or more UEs are legacy UEs or most or all of the one or more UEs are located at a cell center with sufficient signal strengths; or
   signaling the one or more UEs to disable the extended control signaling to avoid extra processing.

* * * * *

UNITED STATES PATENT AND TRADEMARK OFFICE
CERTIFICATE OF CORRECTION

PATENT NO. : 9,559,824 B2  
APPLICATION NO. : 14/148035  
DATED : January 31, 2017  
INVENTOR(S) : Gilles Charbit et al.

It is certified that error appears in the above-identified patent and that said Letters Patent is hereby corrected as shown below:

In the Claims

Column 12, Line 26, Claim 8, please change "radioframePeriodicny-MTC" to --radioframePeriodicity-MTC--.

Signed and Sealed this  
Seventeenth Day of April, 2018

Andrei Iancu  
*Director of the United States Patent and Trademark Office*